United States Patent

[11] 3,612,571

| [72] | Inventors | Gene F. Hand<br>Stevensville;<br>Robert L. Siewert, St. Joseph, both of Mich. |
|---|---|---|
| [21] | Appl. No. | 869,605 |
| [22] | Filed | Oct. 27, 1969 |
| [45] | Patented | Oct. 12, 1971 |
| [73] | Assignee | Clark Equipment Company |

[54] VEHICLE SUSPENSION MECHANISM
7 Claims, 3 Drawing Figs.
[52] U.S. Cl. ..................................................... 280/124 R,
280/104
[51] Int. Cl. ..................................................... B60g 9/02
[50] Field of Search .......................................... 286/124,
104

[56] References Cited
UNITED STATES PATENTS

| 2,842,358 | 7/1958 | Nardi | 280/104 |
| 2,910,131 | 10/1959 | Krotz | 280/104 |
| 3,010,530 | 11/1961 | Risk | 280/104 |
| 3,338,327 | 8/1967 | Bishop | 280/104 |

*Primary Examiner*—Milton Buchler
*Assistant Examiner*—Steven W. Weinrieb
*Attorneys*—Kenneth C. Witt, John C. Wiessler, Robert H. Johnson and Reginald J. Falkowski

ABSTRACT: A suspension mechanism including a cradle which is pivoted on the frame of the vehicle about a longitudinal axis. An axle support member is secured to an axle and also is pivotally mounted on the cradle about a transverse axis. There is an additional connection between the axle support member and the cradle which restrains pivotal motion between the axle support member and the cradle.

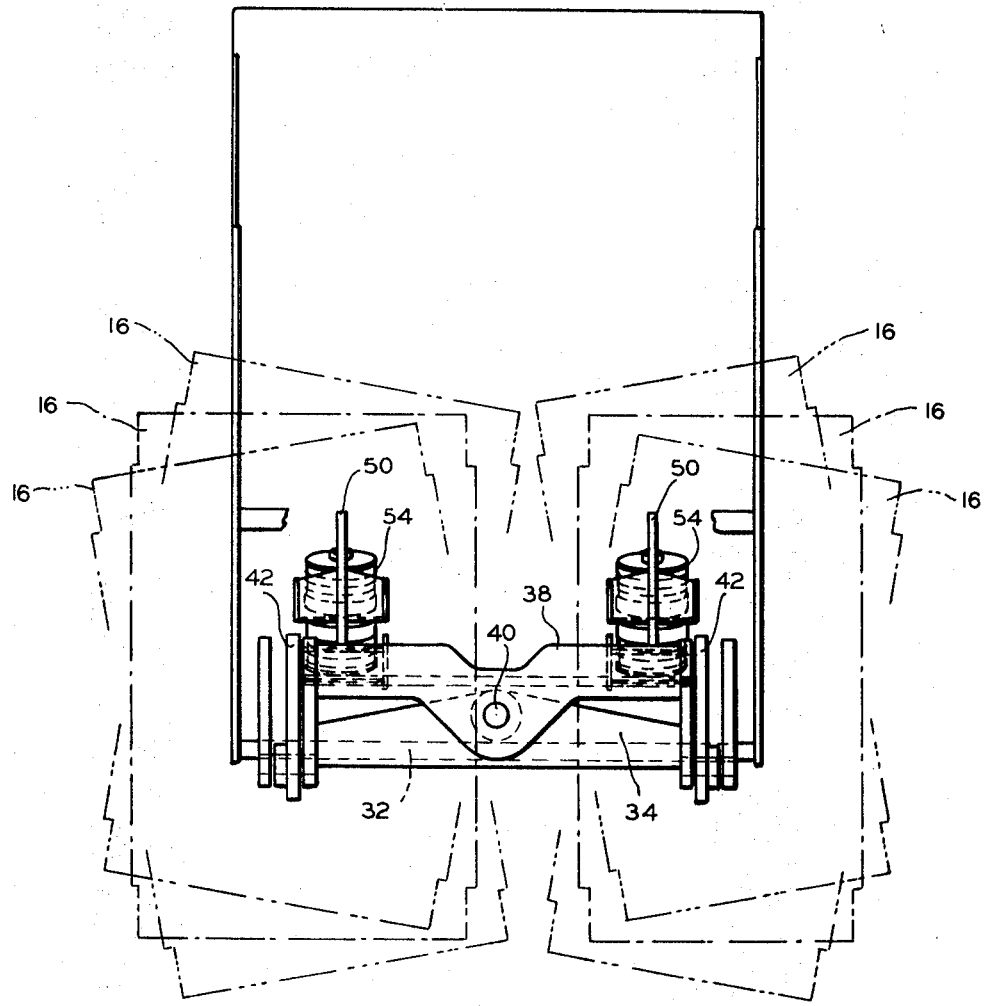

VEHICLE SUSPENSION MECHANISM

BACKGROUND OF THE INVENTION

This invention relates to a suspension mechanism which is particularly useful for vehicles such as compactors which are utilized to compact loose earth on road construction projects and the like, although it will be appreciated that it is adaptable for other vehicles and applications as well. Such compaction vehicles frequently are equipped with sheeps foot or other types of projections or pads on the outer surface of the wheels with the result that when the vehicle passes over the ground during the tamping or compacting operation, considerable shock and vibration is generated. Of course, the ground itself is likely to be rather uneven under such circumstances and this also contributes to the shock and vibration. Such shock and vibration can be unpleasant and tiring to the operator and also deleterious to the various parts of the vehicle, and it is desirable, therefore, that it be minimized. The present suspension mechanism has the effect of minimizing such shocks and vibrations.

SUMMARY OF THE INVENTION

In one preferred mode or embodiment of the invention, we provide a suspension mechanism for a vehicle which has a cradle pivotally mounted on the frame with the cradle arranged to pivot about a longitudinal axis. An axle is secured to an axle support member and the latter in turn is pivotally mounted on the cradle about a transverse axis. An additional connection is provided between the axle support member and the cradle, and such additional connection restrains pivotal motion between the axle support member and the cradle and reduces shock and vibration.

BRIEF DESCRIPTION OF THE DRAWING

FIG. 3 shows a sectional view along the line 3—3 of FIG. 1.

DESCRIPTION OF THE PREFERRED EMBODIMENT

Figure 1:
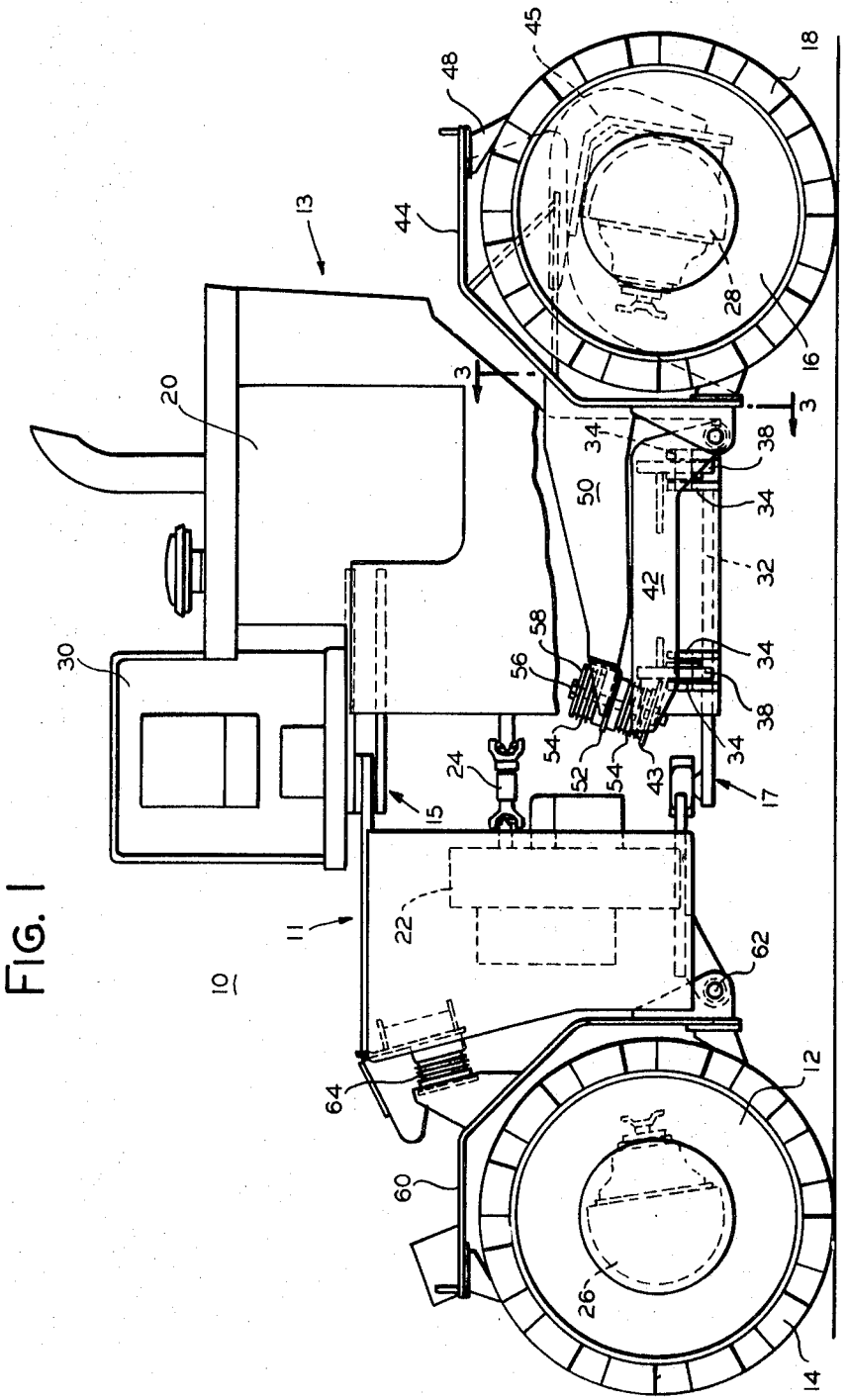
FIG. 1 shows a side elevational view of a self-propelled compaction vehicle embodying the present invention, with certain portions cut away.

The numeral 10 on the drawing designates generally a self-propelled vehicle of the articulated or pivot steer type having four wheel drive, for compacting loose earth and the like. The vehicle 10 includes a pair of front wheels 12 having projections 14 thereon for facilitating the compacting operation. The rear wheels 16 are the same as the front wheels 12, with projections 18 thereon. It will be observed that the front and rear wheels are reversed. That is, each pair of wheels includes a narrow wheel and a wide wheel. The narrow wheel is on the right side (facing the front of the machine) in the rear, whereas it is on the left side in the front of the machine. The purpose of this is so that the gaps between the two wheels in front and rear are offset from each other with the result that as the vehicle passes over an area to be compacted no part of the area is missed by the wheels.

The wheels are operated from an engine which is housed in an enclosure 20 and drives all four wheels through a drive train which includes a transmission 22 which is coupled by means of a shaft 24 to the engine. The pairs of wheels at the ends of the machine are mounted respectively on axles which are indicated generally by the numerals 26 and 28, but are not shown completely in the drawing in order to simplify it. Each of these axles and the wheels thereon are driven by a suitable connection to the transmission 22.

The vehicle 10 has two main body portions indicated respectively by the numerals 11 and 13 which are joined together by a combined two-part steering and draft coupling indicated generally by the numerals 15 and 17. The vehicle is steered by means of suitable hydraulic actuators (not shown) connected between the two body portions 11 and 13 which pivot one part of the body potion with respect to the other about vertical axis 19 (see FIG. 2). The vehicle is controlled from a suitable operator's station which is indicated generally by cab 30 and which contains the necessary controls for operation of the engine, for steering, and for other operations.

The rear body portion 13 of the vehicle includes a lower horizontally disposed flat horizontal frame portion indicated by the numeral 32, and frame portion 32 has secured thereto two pairs of transverse vertically disposed brace members 34. A cradle 36 overlies the frame portion 32 and is pivoted to braces 34 thereon by means of suitable pivot connections 37 (see FIG. 2) to a pair of transverse vertically arranged brace portions 38 forming a portion of the cradle structure so that the cradle may pivot about a longitudinal axis which is indicated in FIGS. 2 and 3 by the numeral 40.

Figure 2:
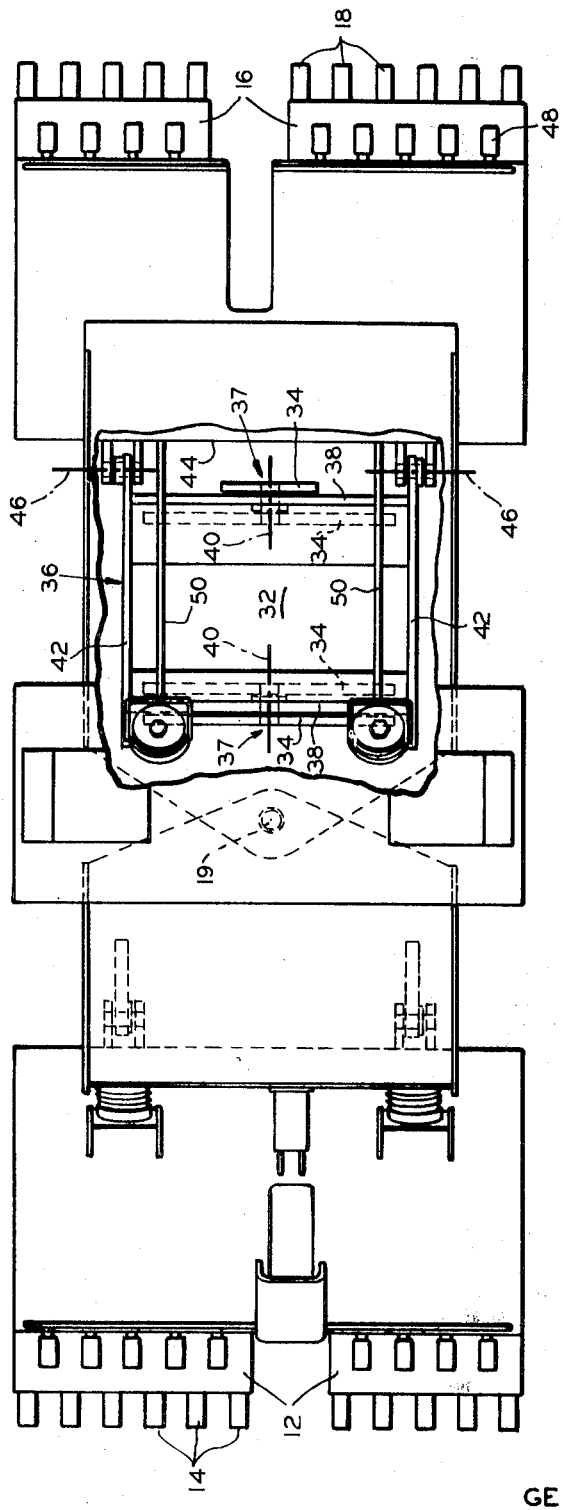
FIG. 2 shows a top plan view of the same vehicle, again with certain portions cut way.

As may be seen best in FIG. 2, the transverse brace members 38 of the cradle are located between and secured to a pair of longitudinally extending structural members 42, one on each side of the cradle structure. The members 42 pivot the cradle 36 on axle supporting structure 44, as indicated, about a transverse axis 46. The axle supporting structure 44, as shown in fIG. 2, is secured to the rear axle 28 by means of suitable interconnecting structure indicated generally by the numeral 45. The axle supporting structure 44 also serves as a fender or cover over the rear wheels, as indicated in FIG. 1 of the drawing, and at the rear extremity in this particular embodiment, carries cleaners 48 for the rear wheels 16.

At the front extremity of structural members 42 of the pivoted cradle, each carries a tilted base 43 for a spring or shock absorbing device. A pair of arms each designated by the numeral 50 (see FIGS. 1 and 2) is rigidly secured to axle support structure 44 at their rearward ends, and form a unitary part of such structure. The arms project forwardly and each has a flat base portion 52 at the forward end which parallels approximately the base portion 43 at the forward end of each of the structural members 42 of the cradle.

As illustrated, there is a stack of dish-shaped rubber members indicated by the numeral 54 both above and below each arm portion base 52. By means of a nut and bolt indicated by 56 in conjunction with a plate 58 on top of each stack of rubber members, these rubber devices are placed under compression so that they resist movement of arm 50 either upwardly or downwardly, however, they do permit a limited amount of such movement and after such movement, because of their resiliency, restore the arm 50 to its initial normal position. Thus, the rubber structures provide for restraining movement of the axle support structure with respect to the cradle and also, because of their resiliency, provide for absorbing shocks, bumps and the like. It will be appreciated that other resilient devices may be utilized for this purpose such as circular flat metal springs, coiled metal springs, and the like.

To further accommodate the vehicle to rough terrain and to absorb shocks and bumps, it will be appreciated that as the vehicle 10 moves over rough and uneven terrain, the cradle 36, together with the rear axle support 44, and the rear axle 28 and wheels 16 pivot about longitudinal horizontal axis 40 in a manner indicated generally by the dot-dash lines in FIG. 3. Although this figure does not show the pivoted positions of the cradle and the shock absorbing and restraining devices, it will be appreciated that they pivot also about axis 40 along with the rear wheels which are shown in both extreme positions and the neutral position in dot-dash lines.

The front wheel support structure is indicated by the numeral 60 and similarly to the rear wheels provides a cover over the wheels as well as support for the axle and wheels. The front axle support structure 60 is pivoted about an axis 62 (see FIG. 1) and resilient shock absorbing devices 64 (which may be similar to the stacks of dished rubber devices 54) are provided for absorbing shocks on the front wheels and axle of the vehicle.

While we have described and illustrated herein a preferred mode for carrying out our invention, it should be understood that modifications may be made without departing from the true spirit and scope of our invention.

I claim:

1. A suspension mechanism for a vehicle having a frame and a transversely disposed axle comprising, a cradle pivotally mounted on the frame and arranged to pivot about a longitudinal axis, an axle support member secured to the axle and pivotally mounted on the said cradle about a transverse axis, and an additional connection between the said axle support member and the said cradle restraining pivotal motion between the axle support member and the cradle.

2. A suspension mechanism as specified in claim 1 in which the said additional connection comprises an arm rigidly connected to and projecting from the said axle support member and resilient means carried by the said cradle and associated with the outer extremity of the said arm for resisting movement of the arm from the normal neutral position and tending to restore it to such normal neutral position when any such movement occurs.

3. A suspension mechanism as specified in claim 1 in which the said cradle is an elongated structure and the said pivotal connection between the cradle and the said axle support member is near one end of the said cradle while the said additional connection between the axle support member and the cradle is near the opposite extremity of the cradle.

4. A suspension mechanism as specified in claim 1 which the said cradle is an elongated structure, the said pivotal connection between the cradle and the said axle support member is near one end of said cradle, a pair of arms are rigidly connected to and project from the axle support member with their outer extremities adjacent the other end of the said cradle, and resilient devices under compression are connected between each of the said arms near the said extremities thereof and the said other end of the cradle.

5. A suspension mechanism as specified in claim 4 in which the said resilient devices are located both between the said arms and the said cradle and on the surfaces of the arms away from the cradle, all the resilient devices normally being under compression.

6. A suspension mechanism as specified in claim 5 in which the said resilient devices are respectively stacks of dish-shaped rubber members.

7. A suspension mechanism as specified in claim 1 in which the axle support member is pivotally mounted on the said cradle about a transverse axis which is different from the axis of the said axle.